US005757528A

United States Patent [19]
Bradley et al.

[11] Patent Number: 5,757,528
[45] Date of Patent: May 26, 1998

[54] UNIVERSAL DIRECTIONALLY ADJUSTABLE OPTICAL TRANSMITTER AND RECEIVER ASSEMBLY

[75] Inventors: Robert L. Bradley, West Hill; Albert J. Kerklaan, Milton; Andris Lauris, Aurora, all of Canada

[73] Assignee: International Business Machines Corporation, Armonk, N.Y.

[21] Appl. No.: 701,286

[22] Filed: Aug. 22, 1996

[30] Foreign Application Priority Data

Dec. 29, 1995 [CA] Canada ................................. 2166356

[51] Int. Cl.$^6$ ................................................. H04B 10/00
[52] U.S. Cl. ........................ 359/152; 359/163; 359/172
[58] Field of Search .......................... 359/143, 152, 359/163, 172; 455/90, 151.2; 370/277, 310

[56] References Cited

U.S. PATENT DOCUMENTS

| | | | |
|---|---|---|---|
| 4,717,913 | 1/1988 | Elger | 359/172 |
| 5,027,433 | 6/1991 | Menadier et al. | 359/152 |
| 5,347,387 | 9/1994 | Rice | 359/152 |

*Primary Examiner*—Kinfe-Michael Negash
*Attorney, Agent, or Firm*—John D. Flynn

[57] ABSTRACT

A universally directionally adjustable optical transceiver. The transceiver comprises a platform for mounting a light emitting diode array and photodiodes. The platform is connected to a mounting ring to provide a first axis of rotation. The mounting ring is connected to a support plate to provide a second axis of rotation. The first and second axis intersect and are mutually perpendicular to provide an omni-directional pointing capability for the transceiver.

8 Claims, 4 Drawing Sheets

UNIVERSAL DIRECTIONALLY ADJUSTABLE OPTICAL TRANSMITTER AND RECEIVER ASSEMBLY

FIELD OF THE INVENTION

The present invention relates to wireless communication systems, and more particularly to an optical transmitter and receiver which is universally directionally adjustable.

BACKGROUND OF THE INVENTION

Local area networks (LANs) are prevalent in computing, and the connection of computers in a LAN provides a convenient vehicle for distributed processing and efficient allocation of resources, such as servers, printers, scanners, and gateway communication devices. In the office environment, LANs typically comprise wired interconnections between stations or computers. Wired LANs have the disadvantage that extensive cabling is required to interconnect the stations in the network. The installation of such cabling is generally inconvenient and gives rise to inflexibility if it is desired to alter the physical locations of the stations comprising the network.

To overcome the disadvantages of wired LANs, it has been proposed to utilize a wireless transmission link to replace the cabling connections of a wired LAN. Wireless communication between two points is well known and two approaches have emerged as solutions for wireless LANs. One solution uses radio frequency (RF) communication techniques to implement the communication channels. The other solution utilizes infrared (IR) radiation as a communication medium. Infrared based systems have found widespread appeal, particularly in an indoor environment, such as an office building. Infrared based systems have the additional advantage of not requiring compliance with the more stringent government regulations that apply to RF based systems, for example, as would be required for a system utilizing microwave frequency signals.

Communication interconnections in a wireless LAN utilizing infrared are set up using infrared transceivers. A station, e.g. personal computer (PC), is connected to a transceiver. The transceiver has an infrared transmitter and an infrared receiver. The infrared transmitter includes at least one infrared light emitting diode (LED), and typically comprises an array of infrared LEDs. The infrared receiver has one or more photodiodes responsive to the output wavelength spectrum of the LED in the transceiver of the communication station on the LAN.

In the art, infrared-based transceivers fall into two general classes: diffused IR transceivers and directed beam IR transceivers. Diffused IR transceivers typically comprise an array of LEDs which disperse infrared beams throughout an office space. The infrared beams are picked up by the receivers of transceivers on stations located throughout the office. Diffused IR transceivers permit a data processing station, i.e. computer, to talk with a number of other stations located in the office space. In directed beam IR transceivers, the infrared beam is directed towards the transceiver of the station intended for communication. In other words, there is a line of sight path between two stations and the infrared beam is directed along this line of sight path. Direct beam IR transceivers are commonly referred to as "point and shoot" or "serial IR" systems, and find widespread use in establishing communication link between a computer and peripheral device, for example, a notebook computer and a laser printer.

The performance and integrity of an infrared communication link will depend on the operating environment, particularly the ambient light and the reflectivity of the interior surfaces. Infrared systems tend to provide better performance in an office space where the ambient light level is not very high, especially, in systems where the carrier beam is not high frequency modulated. The reflectivity of the interior surfaces of an office space will also affect transmission of infrared beams. Surfaces having a tendency to absorb infrared beams will degrade the performance of an infrared communication system, and in particular a system comprising diffused beam devices. It is possible to lessen the effects of the operating environment using set-up techniques for the infrared transceivers and adjustments to the orientations of the beam paths.

In the art, there remains a need to provide a universally directionally adjustable infrared transceiver which features ease of operation to facilitate set-up of communication links between stations in a wireless LAN and the capability to easily adjust the orientation of the beam paths.

BRIEF SUMMARY OF THE INVENTION

The present invention provided a wireless transmitter having a universally directionally adjustable mount. The mount allows omni-directional movement of the transmitter to allow optimizing the transmit and receive capabilities of the transceiver.

In a first aspect, the present invention provides an apparatus for a wireless transceiver having a transmitter including a light emitting diode array and a receiver having a plurality of photodiodes, said apparatus comprising: a mounting ring; support means including connecting means for connecting said mounting ring, said connecting means allowing said mounting ring to rotate about a first axis; said mounting ring including second connecting means for connecting a platform, said second connecting means permitting said platform to rotate about a second axis; and said platform having means for mounting circuit means coupled to said light emitting diode array and said photodiodes.

In a second aspect, the present invention provides an apparatus for a wireless transceiver having a transmitter including a light emitting diode array and a receiver having a plurality of photodiodes, said apparatus comprising: a mounting ring; support means including connecting means for connecting said mounting ring, said connecting means allowing said mounting ring to rotate about a first axis; said mounting ring including second connecting means for connecting a platform, said second connecting means permitting said platform to rotate about a second axis; said platform having means for mounting circuit means coupled to said light emitting diode array and said photodiodes; cover means for covering said platform and light emitting diode array and said photodiode, said cover means being transparent to radiation emitted by said light emitting diodes and detected by said photodiodes; and reflector means for deflecting beams emitted from said light emitting diode array, said reflector means being located adjacent said light emitting diode array and being movable to a non-deflecting position.

BRIEF DESCRIPTION OF THE DRAWINGS

Reference will now be made, by way of example, to the accompanying drawings which show a preferred embodiment of the present invention, and in which.

DETAILED DESCRIPTION OF THE PREFERRED EMBODIMENT

Figure 1:
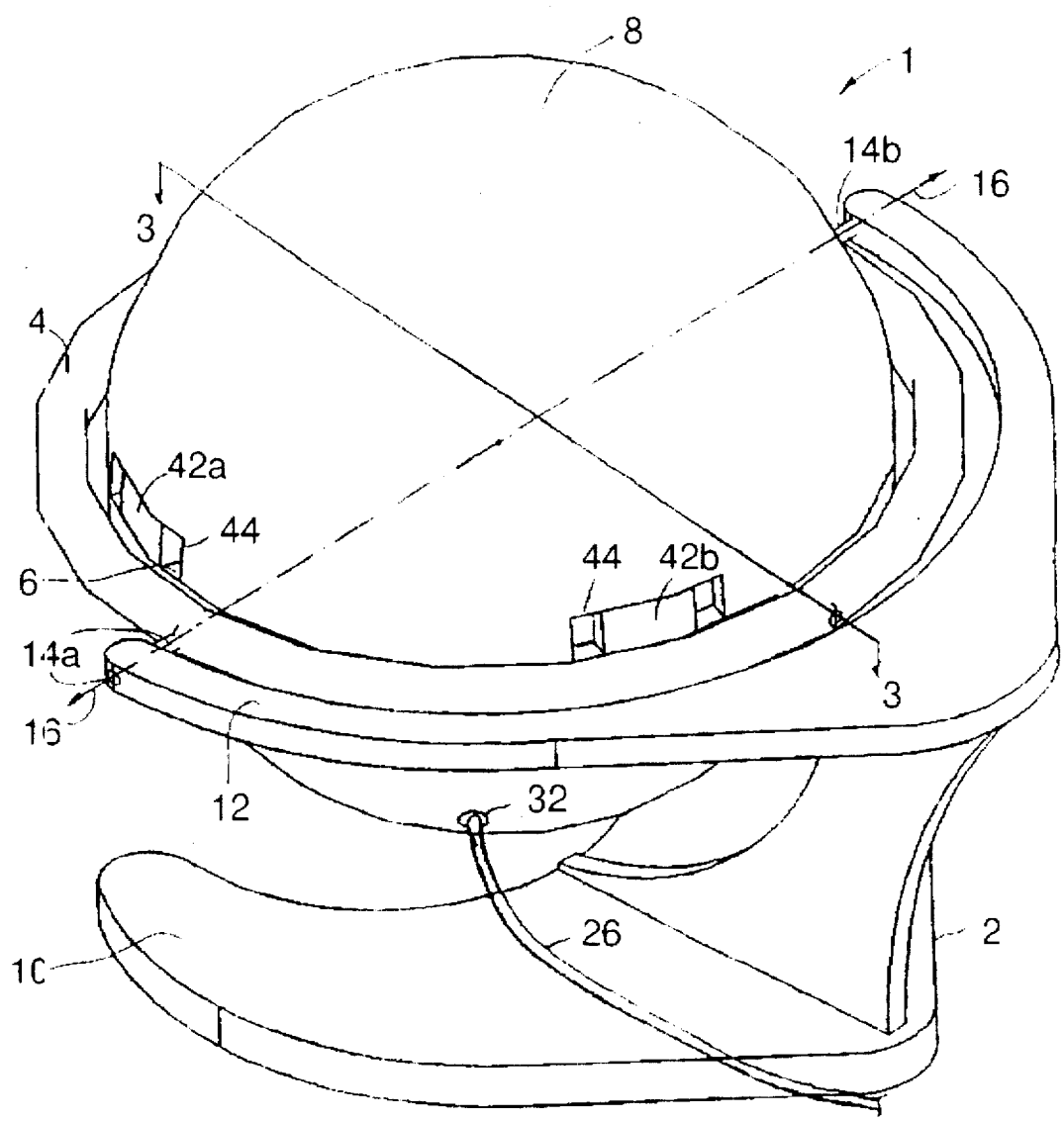
FIG. 1 is a perspective view of a universally directionally adjustable optical transceiver according to the present invention.

Reference is made to FIG. 1 which shows a universally directionally adjustable wireless transceiver 1 according to the present invention. Like numerals indicated like elements in FIGS. 1 to 5.

The transceiver 1 includes a support base 2, a mounting ring 4, and a platform 6. In FIG. 1, the platform 6 is enclosed by a spherical cover 8. The support base 2 provides a stand for mounting the sphere 8 (and platform 6) and has a pedestal 10 allowing the transceiver I to be placed on flat services, such as the top of a desk or filing cabinet in an office environment.

As shown in FIG. 1, the base 2 has a support plate 12. The mounting ring 4 connects to the support plate 12 through a pair of pins 14a, 14b. The arrangement of the pins 14a, 14b provides an axis 16 (shown as a broken chain line) of rotation for the mounting ring 4. The axis 16 preferably provides a full 360° of rotation.

Figure 2:
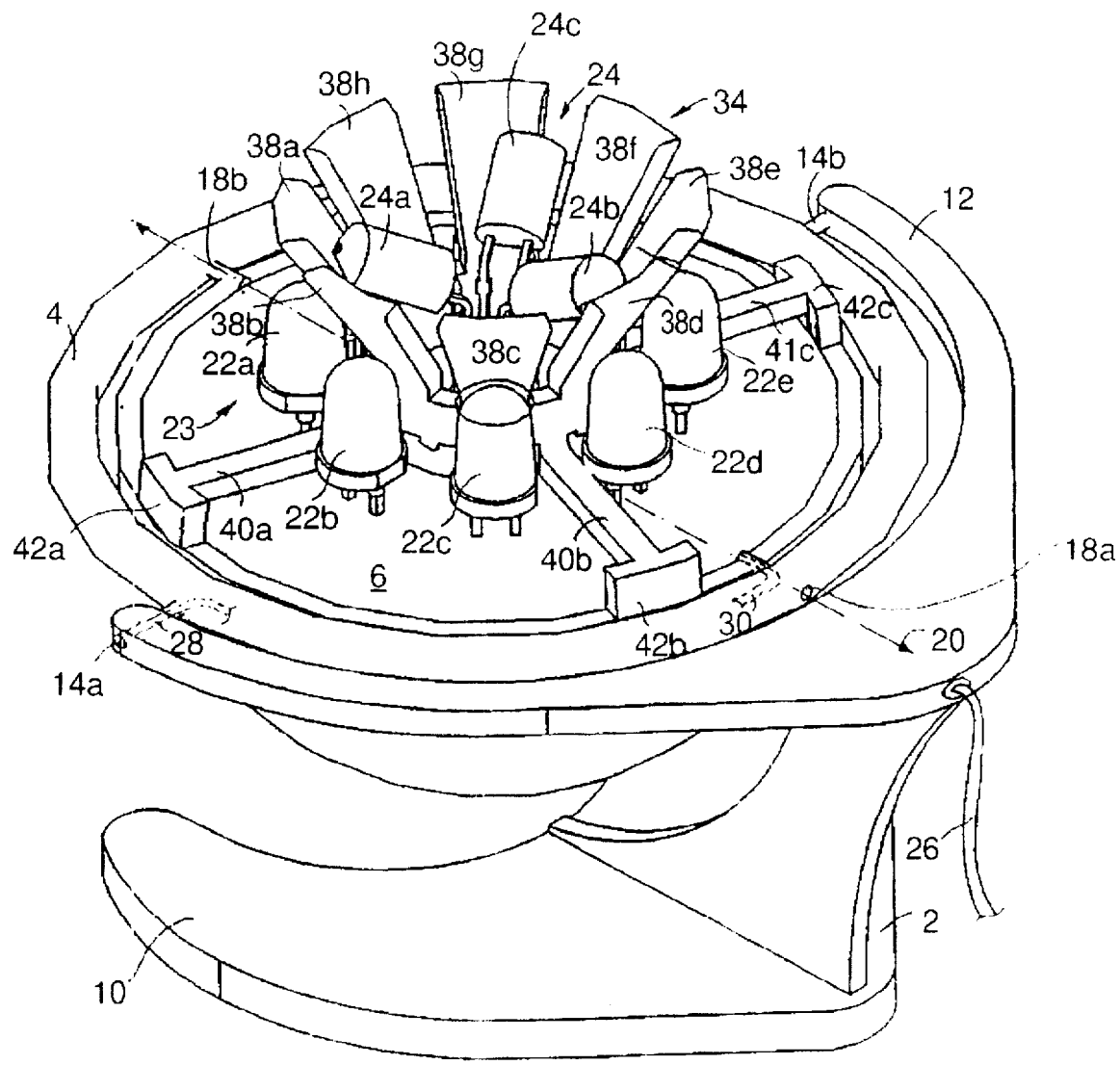
FIG. 2 is a perspective view of the optical transceiver of FIG. 1 with the sphere member removed.
Figure 3:
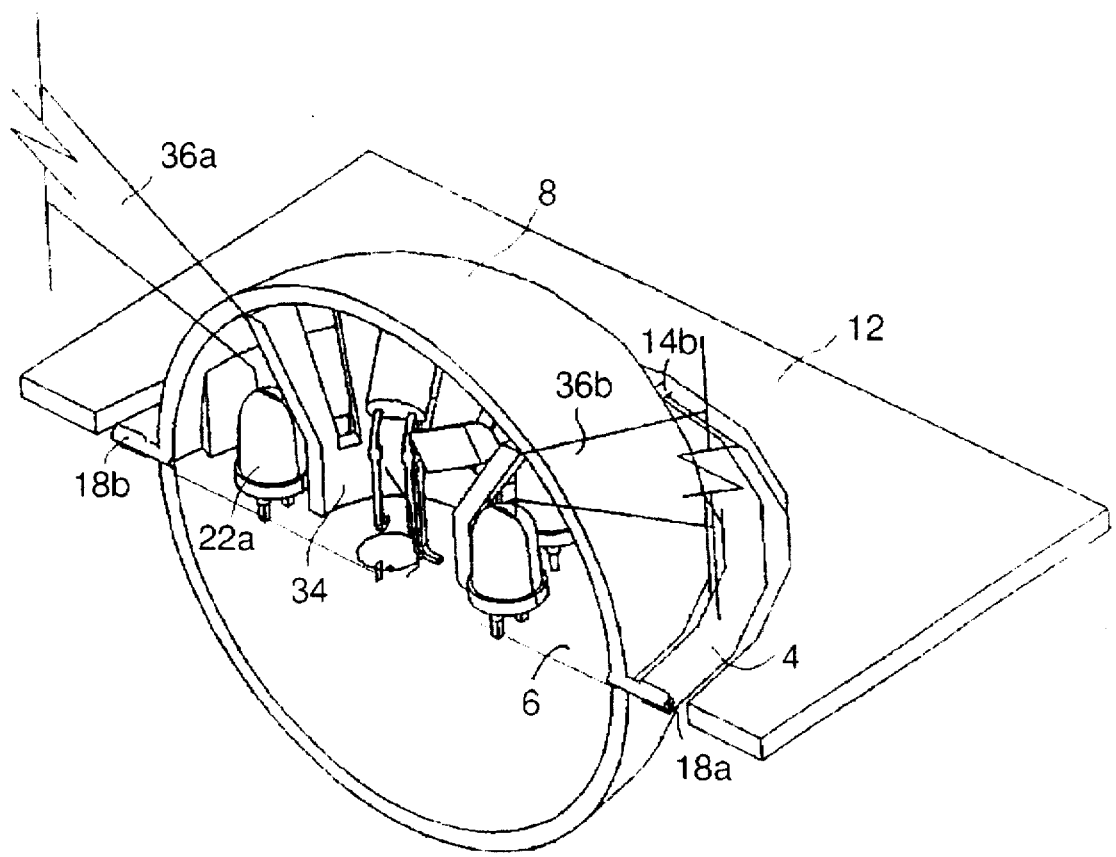
FIG. 3 is a partial sectional view of the optical transceiver taken through the line 3—3 in FIG. 1.

The platform 6 connects to the mounting ring 4 through a pair of pins 18a, 18b as shown in the FIG. 2. The arrangement of the pins 18a, 18b provides an axis 20 of rotation for the platform 6. The second axis 20 also preferably provides a full 360° of rotation. As shown in the figures, the first and second axis 16 and 18 intersect and are mutually perpendicular thereby enabling the platform 6 to be inclined in any direction.

Referring to FIG. 2, a light emitting diode array 22 and a photodiode array 24 are mounted on the platform 6. The light emitting diode array 22 comprises light emitting diodes 22 of conventional design with LEDs being shown individually as 22a, 22b, 22c, 22d, 22e, 22f, 22g. The LEDs 22 are mounted on the platform 6 and suitably connected electrically. For example, the platform 6 may include electrical tracks and connections formed on a substrate. The photodiode array 24 comprises photodiodes of known design, shown individually as 24a, 24b, 24c in FIG. 2. The photodiodes 24 are also suitably mounted and electrically connected on the platform 6. The arrangement and angular orientation of the photodiodes 24 and the LEDs 22 are within the understanding of one skilled in the art and therefore further description is not provided.

The light emitting array 22 and photodiode array 24 are coupled to external conductors indicated generally by 26 in FIG. 2. The external conductors 26 connect the transceiver 1 to a computer (not shown). As shown in FIG. 2, the connection for the pin 14a includes a conduit shown in broken lines and indicated generally by 28 for routing electrical conductors between the support plate 12 and the mounting ring 4. Similarly, the connection for the pin 18a includes a conduit 30 (shown in broken lines) for routing electrical conductors between the mounting ring 4 and the platform 6 to the LEDs 22 and the photodiodes 24.

The electrical conductors 26 may also be connected directly to the platform 6 through a port 32 in the spherical cover 8 as shown in FIG. 1. Routing electrical conductors through the conduits 28,30 has the advantage of keeping the electrical conductor 26 out of the way when the platform 6 and spherical member 8 is rotated.

Referring to FIG. 2, the LEDs 22 are mounted vertically (relative to the platform 6) in a circular array 23 which means the emitted infrared light beams will converge in a direction determined by the orientation of the platform 6 (and any optical characteristics which be formed in the spherical member 8). As shown in FIG. 2, the platform 6 may also include a beam deflector denoted generally by 34. The deflector 34 provides the ability to deflect the infrared beam from each LED in a near horizontal direction (relative to the platform 6) as illustrated by beams 36a, 36b in FIG. 3. The beam deflector 34 together with the two axis of rotation 16 and 20 of the platform 6 provide the ability to optimize the filling of an office space with the infrared beams emitted by the transceiver 1.

As shown in FIG. 2, the beam deflector 34 comprises an arrangement of deflecting surfaces indicated individually as 38a to 38h. Each of the deflecting surfaces 38 is angled to deflect the emitted beams a predetermined amount. To provide the ability to operate the LED array 22 with deflection, the beam deflector 34 includes actuating members 40a to 40d. The actuating members 40 are used to move the deflecting surfaces 38 between deflecting and non-deflecting positions. To provide the capability to adjust the beam deflector 34 with the spherical member 8 installed, the actuating members 40 include respective finger pads 42a to 42d which are accessible through openings 44 in the spherical member 8 as shown in FIG. 1.

Figure 4:
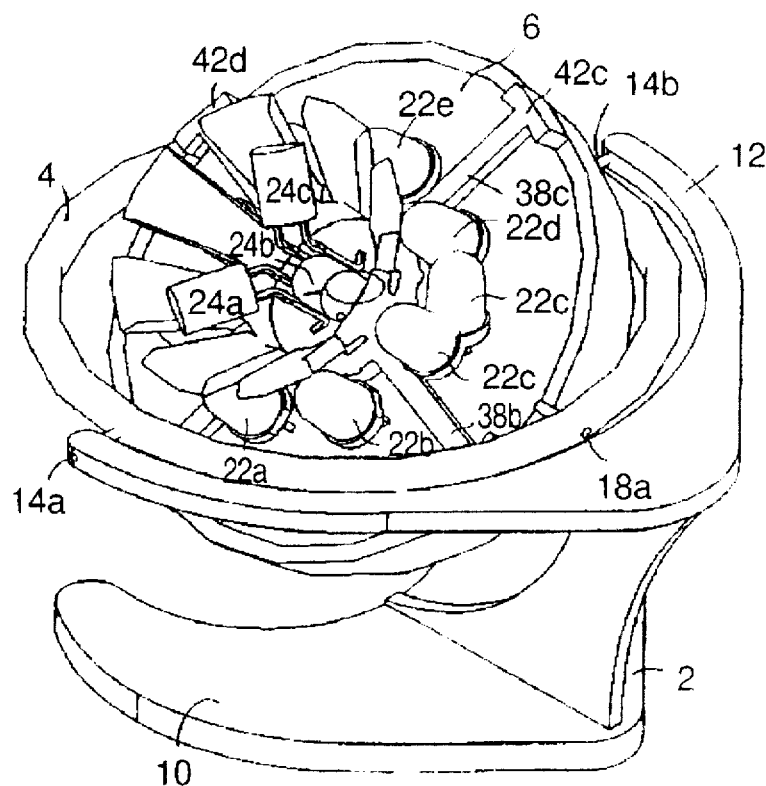
FIG. 4 is a perspective view of the optical transceiver of FIG. 2 in a first adjusted position.
Figure 5:
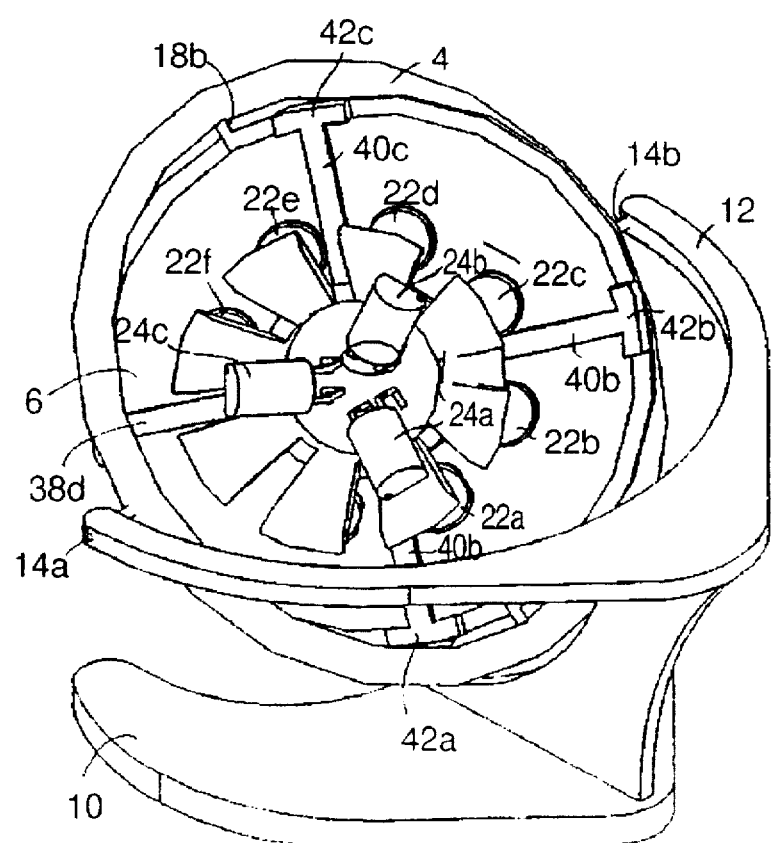
FIG. 5 is a perspective view of the optical transceiver of FIG. 2 in another adjusted position.

The arrangement of the mounting ring 4 and the platform 6 on the respective axis of rotation provide the LED array 22 and photodiode array 24 mounted on the platform 6 with unlimited pointing capabilities. FIGS. 4 and 5 show exemplary pointing positions for the transceiver 1.

The present invention may be embodied in other specific forms without departing from the spirit or essential characteristics thereof. Therefore, the presently discussed embodiments are considered to be illustrative and not restrictive, the scope of the invention being indicated by the appended claims rather than the foregoing description, and all changes which come within the meaning and range of equivalency of the claims are therefore intended to be embraced therein.

What is claimed is:

1. An apparatus for a wireless transceiver having a transmitter including a light emitting diode array and a receiver having a plurality of photodiodes, said apparatus comprising;

a mounting ring;

a support means including a first connecting means for connecting said mounting ring, said first connecting means allowing said mounting ring to rotate about a first axis; and said mounting ring including a second connecting means for connecting a platform, said second connecting means permitting said platform to rotate about a second axis, said platform having a means for mounting a circuit coupled to said light emitting diode array and said photodiodes.

2. The apparatus as claimed in claim 1, wherein the second connecting means include a conduit for receiving a conductor for connection to said circuit, and said first connecting means include a conduit for receiving said conductor from said platform for connection to a data processing station.

3. The apparatus as claimed in claim 1, wherein said platform includes a beam deflector for deflecting beams emitted from said light emitting diode array, said beam deflector located adjacent to said light emitting diode array and being movable to a non-deflecting position.

4. The apparatus as claimed in claim 3, wherein said beam deflector is operative to deflect said beams at angles of 90°.

5. The apparatus as claimed in claim 2, wherein said first axis and second axis intersect and are mutually perpendicular.

6. The apparatus as claimed in claim 3, wherein said first axis and second axis intersect and are mutually perpendicular.

7. An apparatus for a wireless transceiver having a transmitter including a light emitting diode array and a receiver having a plurality of photodiodes, said apparatus comprising:

a mounting ring;

a support means including a first connecting means for connecting said mounting ring, said first connecting means allowing said mounting ring to rotate about a first axis;

said mounting ring including a second connecting means for connecting a platform, said second connecting means permitting said platform to rotate about a second axis, said platform having a means for mounting a circuit coupled to said light emitting diode array and said photodiodes;

a cover for covering said platform and said light emitting diode array and said photodiodes, said cover being transparent to radiation emitted by said light emitting diodes and detected by said photodiodes; and a beam deflector for deflecting beams emitted from said light emitting diode array, said beam deflector located adjacent said light emitting diode array and being movable to a non-deflecting position.

8. The apparatus as claimed in claim 7, further including an actuating means for moving said beam deflector between non-deflecting and deflecting positions, said cover having openings for operating said actuating means.

* * * * *